United States Patent Office 2,697,711
Patented Dec. 21, 1954

2,697,711
TETRA(2-BENZIMIDAZOLYL)-ETHYLENES AND PROCESS

Robert G. Arnold, Salem, N. J., assignor to E. I. du Pont de Nemours and Company, Wilmington, Del., a corporation of Delaware No Drawing. Application March 27, 1952,
Serial No. 278,971

12 Claims. (Cl. 260—309.2)

This invention relates to novel organic compounds useful for the production of coloring matters.

According to this invention novel coloring matters are produced by synthesizing organic compounds which possess a characteristic structure as expressed by the following formula

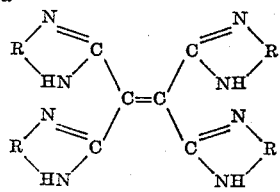

wherein the R's represent monocyclic aromatic radicals to which the respective N-atoms are attached in ortho positions. The novel coloring compounds may be designated generically as tetrabenzimidazolyl ethylenes, wherein the benzo rings may be variously substituted by alkyl, alkoxy, halogen, nitro, amino and sulfo groups. According to the nature of such substituents, the novel coloring matters may be water-soluble and usable as dyestuffs, or they may be water-insoluble and useful as pigments.

Further details on the nature and structure of my novel chemical compounds will appear from their modes of synthesis which follow. Several modes of synthesis are available, and some of them produce first isolable intermediate compounds, which are also novel and accordingly, constitute part of this invention.

According to one mode of synthesis, novel and useful intermediate compounds are first produced by reacting 1,1,2,2-tetracarbomethoxy ethane with a phenyl compound having two primary amino groups in ortho position to each other. The products thus obtained are water-insoluble and essentially colorless compounds, but they have the surprising quality of being readily convertible into coloring matters of high tinctorial value upon being treated with oxidizing agents.

The o-phenylene diamine compound may have the general formula

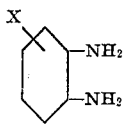

wherein X represents hydrogen, methyl, ethyl or methoxy.

The reaction is carried out in an inert organic solvent at a temperature sufficiently high to evaporate the methyl alcohol and water split off, and the result may be expressed by the following typical equation:

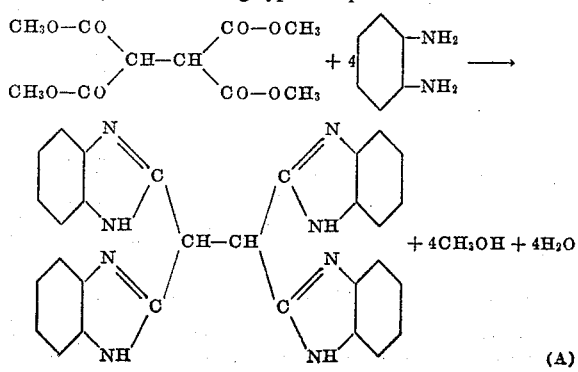
(A)

The compound marked (A) may be designated as 1,1,2,2-tetra(2-benzimidazolyl)-ethane. Where the initial diamine has inert substituents such as methyl or methoxy, these appear in the resulting benzimidazolyl radicals.

This ethane compound is by itself a colorless, water-insoluble compound, but it has the remarkable property of yielding yellow to orange coloring matters, of valuable tinctorial properties, if treated to convert the ethane link into an ethylene link. This conversion may be effected by oxidation in various manners, as more fully discussed below. The resulting color, in the typical case above, then has the formula:

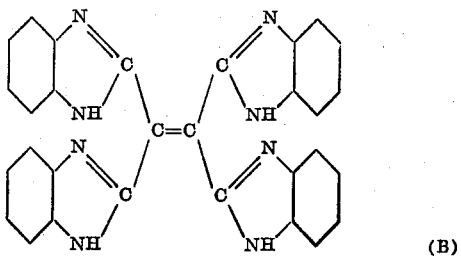
(B)

Various modes of oxidation may be applied. For instance, the intermediate may be treated in an inert organic diluent with halogenating agents (e. g., chlorine or bromine), nitrating agents (mixtures of nitric and sulfuric acid) or other oxidizing agents which are sufficiently strong to remove the two H atoms from the ethane linkage but not so powerful as to disrupt the essential structure of the compound. In such cases, substitution in the benzene rings may take place simultaneously, and the resulting compound will generally possess from 1 to 4 nitro groups, or 1 or more halogen atoms. Oxidation without introduction of substituents may be effected by treatment with nitrobenzene in the presence of mild alkalis, for instance an alkali-metal carbonate, or by treatment with glacial acetic acid solutions of selenium dioxide, or by heating in molten sulfur, or by heating the dry powder or a suspension thereof in a high-boiling solvent in open air at temperatures of about 200° C.

The resulting coloring matter in all the cases heretofore mentioned is water-insoluble, and is therefore useful as a pigment.

However, the oxidized compound may also be treated with sulfonating agents, for instance oleum, in which event the compound becomes sulfonated and acquires water-solubility. The resulting compound in this case may be used as a dyestuff, applicable from aqueous solution, and may be applied for instance as an acid dye for wool.

Where the oxidation treatment introduces nitro groups into the color molecule, or where additional nitro groups have been introduced by nitrating the oxidized color, these may be reduced to amino groups, and then the color may be subjected to various, per se known, reactions applicable to amines, for instance diazotization and coupling, replacement of the hydrogen atoms of the amino groups by alkyl, aryl or acyl radicals, etc.

Likewise, where the coloring matter possesses sulfonic acid groups, these may be laked, in manner per se known, for instance by the aid of barium chloride or aluminum hydroxide.

It is clear, that the coloring matters resulting from the oxidation of my novel intermediate compounds are themselves capable of serving as intermediates for a vast field of novel pigments and dyestuffs.

The temperature for the synthesis of the intermediate ethane compound is preferably selected in the range of 160° C. to 210° C. Accordingly, the solvent selected should preferably be one boiling above such temperature, or provisions should be made for refluxing it. As typical solvents which I found convenient for the above purpose may be mentioned o-dichlorobenzene, trichlorobenzene, naphthalene, α-chloro-naphthalene, α-methylnaphthalene, phenol, the chlorophenols, and nitrobenzene if used in the absence of alkalis.

When nitrobenzene is used as solvent in the presence of mild alkalis, for instance an alkali-metal carbonate, the intermediate ethane is oxidized in situ, and the reaction results directly in the colored ethylene compound.

The reaction is generally complete in 5 to 6 hours, during which period, in those cases where the reaction mass is free of oxidizing agents, a white solid, sparingly soluble in the organic medium employed, is formed. This material is isolated from the cooled reaction mixture by dilution with alcohol followed by filtration and washing with alcohol or water. Upon drying, the intermediate tetra-(2-benzimidazolyl)-ethane may be stored and shipped, or it may be ground to a fine powder and made into a thin paste with water or an organic liquid, in which condition it is ready for the oxidation treatments mentioned above.

According to another mode of synthesis, described more fully and claimed in my copending application Ser. No. 280,399, the novel coloring matters are produced from intermediates which may be designated generically as dibenzimidazolyl-methanes. These in turn are producible by reacting the selected orthophenylene diamine with a lower dialkyl malonate, for instance diethyl or dimethyl malonate. Reaction is effected by heating the two in an inert organic solvent, for instance, one of the non-oxidizing solvents hereinabove mentioned, until alcohol and water are no longer split off. The reaction may be illustrated by the following typical equation:

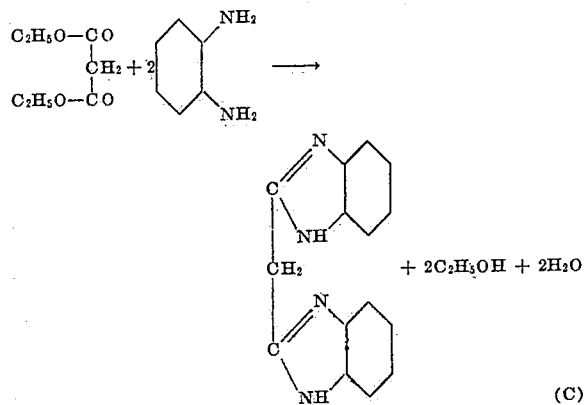

The compound marked (C) is then subjected to the action of an oxidizing agent, which effects dimerization thereof in the following manner:

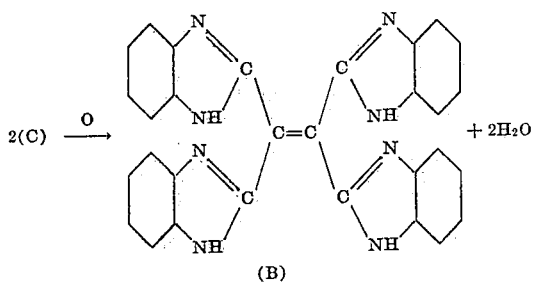

This step may be carried out in a manner similar to the oxidation step in the first mode of synthesis above mentioned, that is, by treating the intermediate methane compound with nitrobenzene in the presence of an alkali-metal carbonate, or with aqueous hypochlorous acid (produced in situ, for instance, from sodium hypochlorite and acetic acid), or with a glacial acetic acid solution of selenium dioxide, or by heating the intermediate in molten sulfur, or by exposing it to air oxidation at an elevated temperature, say about 200° C.

The oxidation may again be effected in situ, by reacting the dialkyl malonate and o-phenylene diamine in an inert solvent consisting of or containing nitrobenzene and an alkali-metal carbonate.

As in the case of the ethane intermediate, oxidation may be attended by introduction of substituents into the benzo rings. For instance, the use of hypochlorous acid results in a compound containing from 0.5 to 1 atoms of Cl per molecule. And, as in the first-mentioned case, the finished ethylene color may be subjected to various nuclear-substitution treatments such as sulfonation, exhaustive chlorination, nitration followed optionally by reduction and then again by diazotization, acylation, etc.

As already noted, the color of the ethylene compounds is generally yellow or orange. Since the color possesses 4 basic N-atoms, it readily forms salts with acids, and these are generally of an intense, red color. Such salts may be formed in the step of oxidation from the ethane stage into the ethylene form, especially where the oxidizing agent is acid for instance in the treatment with nitric acid. In such cases, an extra step of basification, for instance by treatment with dilute sodium hydroxide, is added to the process, to convert the red salt into its free base form, which is of a tinctorially stable, yellow to orange shade.

Without limiting my invention, the following examples will illustrate my preferred mode of procedure. Parts mentioned are by weight.

*Example 1.—Tetrabenzimidazolyl ethane*

15 parts of 1,1,2,2-tetracarbomethoxyethane and 27 parts of o-phenylene diamine were dissolved in 150 parts of o-dichlorobenzene at 80° C. to 85° C. The resulting solution was added to 130 parts of boiling o-dichlorobenzene at such a rate that the reaction temperature did not fall below 170° C. Provision was made for the escape of the volatile products of the condensation (water and methanol), and the reaction was held at reflux (170° C. to 180° C.) for 3 hours. The almost white solid which formed was then filtered off, washed solvent-free with hot alcohol and dried.

The analysis of the product corresponded to $C_{30}H_{22}N_8$, which is the empirical formula of 1,1,2,2-tetra-(2-benzimidazolyl)-ethane.

*Example 2.—Same.—Different procedure*

The following materials were mixed and heated to 85° C.:

100 parts of 1,1,2,2-tetracarbomethoxyethane, 180 parts of o-phenylene diamine and 1100 parts of trichlorobenzene. A clear solution was formed. This solution was then stirred into 435 parts of trichlorobenzene at 200° C., at such a rate that the temperature in the reaction vessel at no time fell below 180° C. The mixture was maintained at 180° to 200° C. for 3 to 4 hours, a steam jacketed condenser being employed to prevent the loss of solvent while allowing the escape of the methanol and water formed during the condensation. At the end of this period the reaction mixture, consisting of a white solid suspended in a pale red solution, was cooled, drowned into alcohol and filtered. The white solid was washed free of trichlorobenzene with hot alcohol and dried at suction. Its C, H and N analysis corresponded to 1,1,2,2-tetra-(benzimidazolyl)-ethane.

*Example 3.—Tetramethyl compound (intermediate)*

A solution was prepared by heating to 80° C. a mixture of 17 parts of 1,1,2,2-tetracarbomethoxyethane, 34 parts of 4-methyl-o-phenylene diamine and 102 parts of trichlorobenzene. This solution was fed slowly and with agitation into 290 parts of trichlorobenzene maintained at a temperature of 180° to 200° C. After further heating in this temperature range for 2 to 3 hours, the evolution of volatile matter from the reaction mass ceased. The mixture was then cooled to room temperature, and the white solid was filtered off, washed with hot alcohol until free of trichlorobenzene, and washed further with water. The filter cake of 1,1,2,2-tetra(5-methyl-2-benzimidazolyl)-ethane thus obtained was retained for further treatment as in Example 7 below.

*Example 4.—Tetraethyl intermediate*

10 parts of 4-ethyl-o-phenylene diamine monohydrochloride were suspended in 100 parts of trichlorobenzene. 15 parts of 27% ammonia were added and the mixture was heated to 190° C. to drive off excess ammonia and water. 7 parts of 1,1,2,2-tetracarbomethoxyethane were then added. The mixture was held at 190° C. for 30 minutes, cooled to room temperature, and the solid was filtered off. The 1,1,2,2-tetra(5-ethyl-2-benzimidazolyl)-ethane thus obtained was retained for further treatment as in Example 8 below.

*Example 5.—Tetramethoxy intermediate*

124 parts of 4-methoxy-o-phenylene diamine and 55 parts of 1,1,2,2-tetracarbomethoxyethane were dissolved in 180 parts of trichlorobenzene at from 50° C. to 70° C. and the resulting solution was added to 1000 parts of boiling trichlorobenzene at such a rate that the reaction temperature did not fall below 180° C. Heating at reflux was continued for 4 hours. The solid which formed was filtered off and washed solvent-free with alcohol. The product, 1,1,2,2-tetra(5-methoxy-2-benzimidazolyl)-ethane, is a pale yellow solid when fresh, but is slowly oxidized by air and turns after several weeks into a dark reddish yellow. Complete oxidation into a coloring matter may be achieved by further treatment as in Example 9 below.

*Example 6.—Oxidation of ethane compound into color*

7 parts of tetra(2-benzimidazolyl)-ethane, as obtained in Example 1 or 2, were suspended in 150 parts of nitrobenzene. 5 parts of potassium carbonate were added, and the mixture was heated to 200° C. After heating at 190°–200° C. for one hour, the mass was cooled to room temperature and the solid was filtered off. The solid was washed with benzene and then with 95% ethyl alcohol and dried. The bright yellow color thus obtained, when analyzed for nitrogen, carbon and hydrogen, gave the figures which correspond closely to those required for tetra(2-benzimidazolyl)-ethylene. The color is characterized by strong tinctorial power and good light stability. It dissolves in concentrated sulfuric acid, producing a red-orange solution. On the other hand, the initial tetra-benzimidazolyl ethane used in this example gives an essentially colorless solution in sulfuric acid.

*Example 7.—Color from tetramethyl intermediate*

The filter-cake of Example 3 was transferred to a suitable vessel and slurried with about 1.5 liters of water. To this slurry were added 510 parts of 70% nitric acid, at from room temperature to about 50° C. The reaction mass became deep red. Following 5 to 10 minutes of stirring the slurry was basified with sodium hydroxide. The bright yellow solid was filtered off, washed base free and dried. Its solution in sulfuric acid was red-orange, and its analysis for C, H and N agreed with the values calculated for a tetramethyl derivative.

*Example 8.—Oxidation of tetraethyl compound*

The filter cake from Example 4 was heated with 15 parts of nitrobenzene and 2 parts of anhydrous potassium carbonate at 205° C. for 30 minutes. The mixture was cooled to 25° C. and filtered. After washing with alcohol and drying, 2.7 parts of bright yellow pigment remained. This pigment was similar to that obtained in Example 7.

*Example 9.—Oxidation of tetramethoxy compound*

The dried product of Example 5 was ground to a fine powder, slurried into dilute alkaline sodium hypochlorite solution (in water), and allowed to stand at room temperature for 1 hour. The solid was then filtered off, washed free of alkali, dried, and acid-pasted with 10 parts of methyl sulfuric acid. The resulting product was a reddish yellow pigment of good tinctorial power and high light fastness. The color of its solution in concentrated sulfuric acid was a red orange. Its analysis agreed with the assumption that it was 1,1,2,2-tetra(5-methoxy-2-benzimidazolyl)-ethylene.

*Example 10.—Oxidation attended by nitration*

The product of Example 2 was ground to a fine powder, and 50 parts of it were suspended in 2000 parts of water. To this suspension were added 640 parts of 70% nitric acid, neither heating nor cooling being applied. After about five minutes stirring the reaction mass was basified with sodium hydroxide and filtered, and the bright yellow solid was washed base free and dried.

In order to obtain a product of small particle size the nitrated material was acid pasted in the customary manner by dissolving 1 part of the pigment in 10 parts of 96% sulfuric acid followed by drowning the solution in water. This acid-pasted product corresponded analytically to 1,1,2,2-tetra(2-benzimidazolyl)-ethylene possessing on the average from 1 to 1.5 nitro groups. The solid is a bright neutral yellow of strong tinctorial power as evidenced by its performance in an ink system. It dissolves in sulfuric acid producing a red-orange colored solution.

*Example 11.—Oxidation with bromination*

75 parts of the dried product obtained in Example 2 were covered with carbon tetrachloride, and 80 parts of liquid bromine were added. The mixture was allowed to stand at 25° C. for 24 hours, and the red solid which formed was filtered off, washed with a little chloroform and dried. The solid was then acid-pasted from 96% sulfuric acid (as described in Example 10), using 10 to 15 parts of acid for each part of solid. The product was somewhat duller and redder in shade than the product of Example 10, but was otherwise similar in appearance and in the color of its sulfuric acid solution, though less fast to light. Analysis of the brominated product showed that it was 1,1,2,2-tetra(2-benzimidazolyl)-ethylene possessing on the average 1 to 2 atoms of fixed bromine, that is, bromine not removed by acid-pasting.

*Example 12.—Direct formation of color*

4 parts of 1,1,2,2-tetracarbomethoxyethylene and 7 parts of o-phenylene diamine were mixed in 100 parts of trichlorobenzene and the mass was rapidly heated to a boil. Boiling was continued for several hours, the volatile products of the condensation being allowed to escape. The red-yellow solid which formed was filtered off, washing solvent free with alcohol, dried, dissolved in 10 times its weight of 96% sulfuric acid, and the solution was drowned in water. The precipitated material was filtered off, washed acid free and dried. Its color in sulfuric acid solution is an intense orange.

*Example 13.—Sulfonation*

The product of Example 13 was sulfonated by treatment with fuming sulfuric acid (30%) at 40° C. for several hours, until a sample was completely soluble in water. The reaction mass was then diluted with water to form an acid dye bath, which dyed wool in neutral yellow shades of fair fastness to light.

*Example 14.—Sulfonation of brominated color*

The product of Example 2 was brominated as in Example 11 except that the bromine treatment at 25° C. was extended over 48 hours. One part of the resulting product was sulfonated by treatment with 20 parts of 20% oleum for 2 hours at 40° C. The sulfonation mass was drowned in a large excess of water, and the drowning mass was adjusted to a pH of from 5 to 6 by addition of sodium hydroxide. This solution was used to dye a sample of woven woolen cloth. The resulting dyeing was a neutral yellow of good fastness to light.

*Example 15.—Nitration followed by reduction*

5 parts of the color obtained in Example 10 were nitrated further by dissolving the solid in 20 parts by volume of fuming nitric acid at room temperature, dropping the resulting solution into 20 parts by volume of 96% sulfuric acid and then stirring for one-half hour at room temperature. The reaction mass was drowned in 200 parts of water. The yellow solid which precipitated was filtered off and washed acid-free. The resulting product was brighter and greener in shade than the starting material and equally strong in its color value. Its color in sulfuric acid solution was red-orange. Analysis for percent C, H and N gave figures which correspond closely to those required for a tetranitro-1,1,2,2-tetra(2-benzimidazolyl)-ethylene.

When reduced with alkaline hydrosulfite, the above product gave the corresponding tetraamino compound, which was found soluble in dilute hydrochloric acid.

*Example 16.—Dibenzimidazolyl methane*

1000 parts of o-phenylene diamine were suspended in 2500 parts of trichlorobenzene and heated under agitation to 170° C. 740 parts of diethyl malonate were added slowly over a period of two hours while the temperature was maintained at 180°–185° C. Water and ethyl alcohol distilled out and were collected and measured. The mixture was then heated to 200° C. and held at 200° C. until no more volatile products were formed (about 1 hour); it was then cooled and filtered. The solid was washed with benzene and alcohol until free of trichlorobenzene. (Alternatively, the trichlorobenzene may be removed by steam distillation.) After drying, a light greenish product was obtained, whose analysis for carbon, hydrogen and nitrogen agreed with the figures required for di(2-benzimidazolyl)-methane. The product is soluble in acetic acid, dilute hydrochloric acid, and both concentrated and dilute sulfuric acid. It is nearly insoluble in benzene and trichlorobenzene, and only sparingly soluble in nitrobenzene and alcohol. After purification it is a light yellow, nearly white, solid.

*Example 17.—Oxidative dimerization into color*

500 parts of di(2-benzimidazolyl)-methane (from Example 17) were suspended in 2000 parts of trichlorobenzene along with 200 parts of anyhdrous potassium carbonate. The mixture was heated to 160° C. and 250 parts of nitrobenzene were added slowly. The mixture was then heated to 190°–195° C. and maintained at this temperature for 3 hours. After cooling, the solid was filtered off and washed with nitrobenzene. Nitrobenzene was steam distilled from the wet cake, and the residual aqueous mass was treated with aqueous 5% sodium hypochlorite at 70° C. until no more hypochlorite was consumed (in order to destroy impurities). The crude, yellow pigment was filtered off, washed with water and dried.

This product is analogous to the products of Examples 6 and 10 in color, solubility and light stability. Analysis for carbon, hydrogen, and nitrogen give values which correspond to those required for 1,1,2,2-tetra(2-benzimidazolyl)-ethylene. The product dissolves in concentrated sulfuric acid producing an orange colored solution. The initial methane compound is nearly colorless in sulfuric acid solution.

*Example 18.—Dimerization with chlorination*

20 parts of di(2-benzimidazolyl)-methane (from Example 17) were dissolved in 200 parts of acetic acid. The solution was heated to 60° C. and 114 parts of a 5.25% solution of sodium hyprochlorite in water was added dropwise during 30 minutes. The temperature was held at 60°–70° C. during addition of hypochlorite, and good agitation was maintained. A bright red product resulted. After cooling the reaction mass, the product was filtered off, washed with water and then with a little dilute ammonium hydroxide. A bright yellow solid resulted. Analysis for C, H, N and Cl gave values which correspond to those calculated for 1,1,2,2-tetra(2-benzimidazolyl)-ethylene possessing 0.5 to 1 chlorine atom. When acid pasted, the product showed similar color, tinctorial strength, and light stability to the product of Example 10.

*Example 19.—Direct color formation by malonate process*

50 parts of o-phenylene diamine and 500 parts of nitrobenzene were heated together, with agitation, to 170° C. 42 parts of diethyl malonate were added slowly (over a period of 2 hours), while maintaining the mixture at a temperature of 180°–185° C. Water and alcohol distilled out during this proeess. The mixture was then heated to 200° C. and held at this temperature until no further volatile products came off (about 20 minutes). The mass was then cooled and filtered. The filter-cake was washed successively with benzene and alcohol until free of nitrobenzene, and dried. The bright yellow color thus obtained was similar in properties to the products of Examples 6, 10 and 18, and its analysis agreed with the assumption that it was 1,1,2,2-tetra(2-benzimidazolyl)-ethylene.

It will be understood that the details of the above examples may be varied widely within the skill of those engaged in this art.

I claim as my invention:
1. As new compounds, the tetrabenzimidazolyl ethanes of the general formula

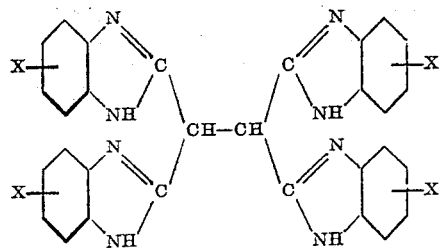

wherein X represents members selected from the group consisting of hydrogen, methyl, ethyl and methoxy, said compounds being colorless, water-insoluble solids which are characterized particularly by yielding water-insoluble coloring matters upon treatment with hot nitrobenzene in the presence of an alkali-metal carbonate.

2. Organic compounds of the general formula

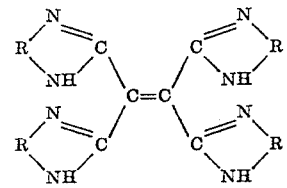

wherein the R's represent monocyclic aromatic radicals of the group consisting of the o-phenylene radical $C_6H_4$ and those derivatives of the o-phenylene radical wherein not more than one nuclear hydrogen atom is replaced by a substituent of the group consisting of alkyl, alkoxy, halogen, nitro, amino and sulfo.

3. Tetra(2-benzimidazolyl)-ethylene.
4. Tetra(5-methyl-2-benzimidazolyl)-ethylene.
5. Tetra(5-ethyl-2-benzimidazolyl)-ethylene.
6. The nuclear nitro derivatives of tetra (2-benzimidazolyl) ethylene, wherein the number of nitro groups does not exceed four per molecule.
7. Tetra(5-methoxy-2-benzimidazolyl)-ethylene.
8. A process of preparing a coloring matter, which comprises reacting an oxidizing agent with a tetrabenzimidazolyl-ethane as defined in claim 1, whereby to convert the ethane linkage into an ethylene linkage.
9. A process as in claim 8, the tetrabenzimidazolyl-ethane being formed in situ by reacting one mole of 1,1,2,2-tetracarbomethoxyethane, in a liquid medium comprising an oxidizing agent, with not less than 4 moles of a phenyl compound selected from the group consisting of o-phenylene diamine and those derivatives thereof wherein not more than 1 nuclear hydrogen atom is replaced by a substituent of the group consisting of methyl, ethyl and methoxy.
10. A process as in claim 9, wherein the liquid reaction mass and oxidizing agent system consists of nitrobenzene containing an alkali metal carbonate.
11. A process as in claim 8, wherein the tetrabenzimidazolyl-ethane is synthesized by reacting, in the absence of an oxidizing agent, one mole of 1,1,2,2-tetracarbomethoxyethane with not less than 4 moles of a phenyl compound selected from the group consisting of o-phenylene diamine and those derivatives thereof wherein not more than 1 nuclear hydrogen atom is replaced by a substituent of the group consisting of methyl, ethyl and methoxy, followed by subjecting the tetrabenzimidazolylethane thus formed to oxidation.
12. A process as in claim 11, the oxidation being effected by the aid of nitrobenzene in the presence of an alkali-metal carbonate.

References Cited in the file of this patent

Shriner et al.: J. Am. Chem. Soc., vol. 63, August 1941, pp. 2277–8.
Wright: Chem. Rev., vol. 48, No. 3, June 1951, pp. 408–11.